United States Patent [19]

Register

[11] 3,990,531

[45] Nov. 9, 1976

[54] INERTIA ACTUATED DOOR LOCKING MECHANISM

[76] Inventor: Lawrence J. Register, P. O. Box 192, Eastpoint, Fla. 32328

[22] Filed: May 28, 1975

[21] Appl. No.: 581,687

[52] U.S. Cl. .......................... 180/112; 292/DIG. 22
[51] Int. Cl.[2] .......................................... B60R 21/00
[58] Field of Search ................ 180/111, 112; 292/1, 292/336.3, 347, DIG. 22, DIG. 65

[56] References Cited

UNITED STATES PATENTS

| | | | |
|---|---|---|---|
| 2,826,444 | 3/1958 | Kurilenko | 180/112 X |
| 2,864,641 | 12/1958 | Leslie | 180/112 X |
| 3,104,124 | 9/1963 | Beck | 180/112 X |
| 3,151,698 | 10/1964 | Pollock | 292/DIG. 65 |
| 3,431,998 | 3/1969 | Martin | 180/112 |
| 3,468,392 | 9/1969 | Hass | 180/112 |
| 3,583,741 | 6/1971 | Breitschwerdt | 292/216 |
| 3,719,248 | 3/1973 | Breitschwerdt | 292/DIG. 22 X |
| 3,799,596 | 3/1974 | Nozomu | 180/111 X |

*Primary Examiner*—Robert R. Song
*Assistant Examiner*—Terrance Siemens
*Attorney, Agent, or Firm*—Clarence A. O'Brien; Harvey B. Jacobson

[57] ABSTRACT

A weight member is supported from an associated vehicle side door for generally horizontal oscillation of at least a major portion of the weight member along a path extending in a front-to-rear direction relative to the direction of intended movement of the vehicle. The vehicle door includes a vertically shiftable door latch lock actuator shiftable between upper and lower active and inactive positions, respectively, and motion transmitting structure is provided and operatively connects the major portion of the weight member to the lock actuator for downward shifting of the latter from an inactive position to its active position in response to inertia shifting of the major portion of the weight member in a forward direction relative to the direction of intended movement of the vehicle.

5 Claims, 3 Drawing Figures

INERTIA ACTUATED DOOR LOCKING MECHANISM

BACKGROUND OF THE INVENTION

Most vehicle doors provided on a majority of passenger and truck type vehicles include vertically shiftable door latch lock actuators shiftable between upper and lower active and inactive positions, respectively. Further, although it is the usual custom of many drivers to downwardly depress the lock actuator upon entrance into a vehicle thereby providing additonal assurance against unintentional opening of the vehicle door as a result of impact, some drivers and passengers only depress the lock actuators of the doors of a vehicle when exiting from the vehicle in order to prevent the latter from being stolen. Accordingly, in many cases the door latch lock actuators of vehicles are not in the active positions thereof when an accident occurs and the doors of the vehicle are more likely to be jarred open as a result of impact during an accident. Accordingly, many vehicle drivers and passengers are thrown from passenger vehicles and the like as the result of impact during an accident and are more severely injured than they would have been if the doors of the vehicle had not opened on impact and they were thereby contained within the vehicle throughout the accident.

Accordingly, a need exists for a mechanism whereby the door latch lock actuators of passenger vehicles and the like may be automatically depressed in the event of impact. Various types of inertia operated mechanisms have been heretofore designed for this purpose and previously patented devices of this type are disclosed in U.S. Pat. Nos. 2,389,315, 2,864,641, 3,066,964, 3,453,015, 3,719,248 and 3,799,596.

SUMMARY OF THE INVENTION

The invention of the instant invention includes a structure whereby the manually depressible door latch lock actuator conventionally provided on passenger vehicle doors may be automatically depressed in the event of sudden deceleration of the vehicle such as occurs in most accidents. The inertia actuated door locking mechanism may be readily incorporated in vehicle doors presently being manufactured as well as added to existing vehicle doors.

The main object of this invention is to provide an inertia actuated mechanism responsive to sudden deceleration of a vehicle in a forward direction for automatically shifting the conventional door latch lock actuator from an inactive position to an active position.

Another object of this invention, in accordance with the immediately preceding object, is to provide a door locking mechanism which may be readily varied in construction so as to be operative to shift the associated door latch lock actuator to its active position in response to inertia forces of various magnitudes.

A final object of this invention to be specifically enumerated herein is to provide an apparatus in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
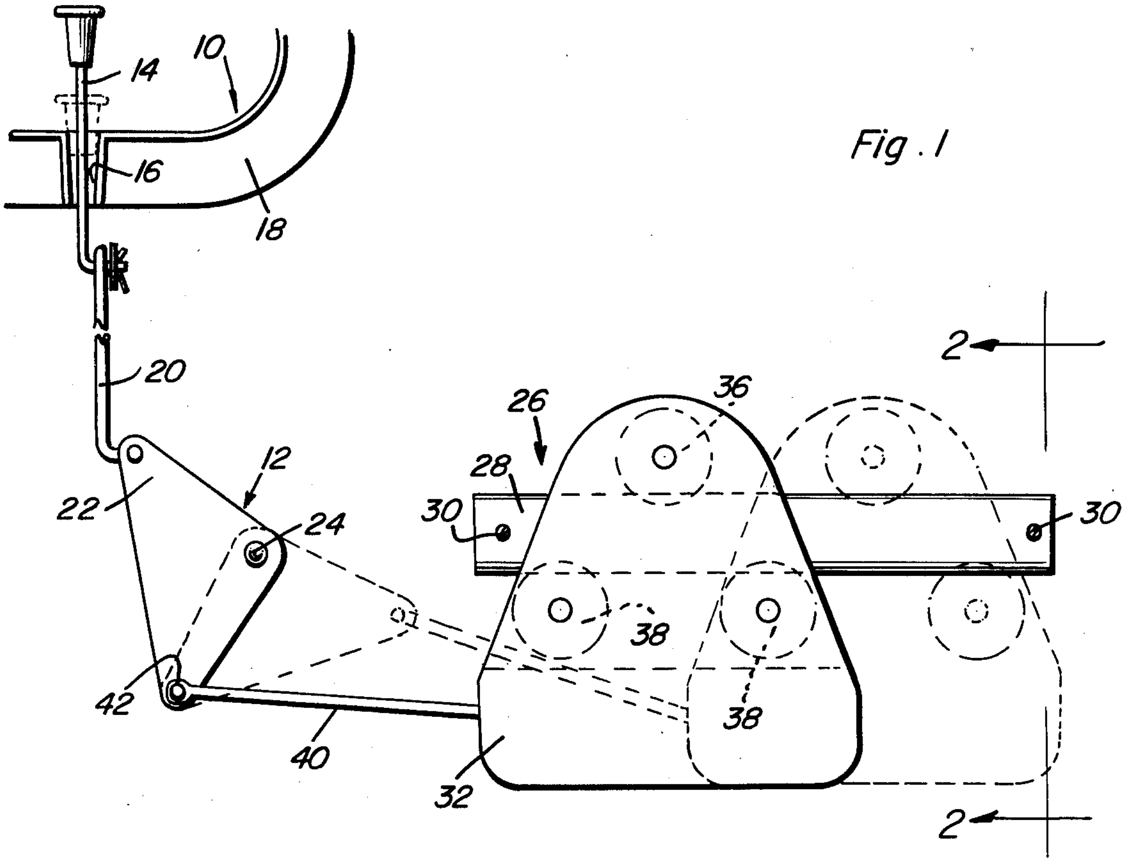
FIG. 1 is a fragmentary elevational view of a conventional vehicle door with a portion of the door latch lock actuating mechanism being illustrated in operative association with a first form of door locking mechanism of the instant invention.
Figure 2:
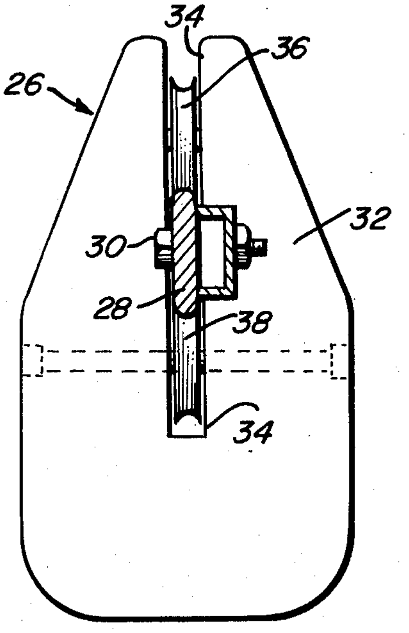
FIG. 2 is a vertical sectional view taken substantially upon the plane indicated by the section line 2—2 of FIG. 1.

Referring now more specifically to the drawings, the numeral 10 generally designates a conventional form of vehicle door including a partially illustrated conventional door latch lock actuating mechanism referred to in general by the reference numeral 12.

The mechanism 12 includes a vertically shiftable actuator 14 which projects upwardly through an opening 16 provided therefor in the garnish moding 18 of the door 10 and the lower end of the actuator 14 is operatively connected, at its lower end within the interior of the door 10, to the upper end of a connecting link 20 having its lower end pivotally connected to a bell crank 22 also comprising a part of the mechanism 12. The bell crank 22 is pivotally supported from the door 10 by means of a pivot fastener 24 and it is to be understood that the bell crank 22 is operatively connected to the door latch lock (not shown) of the door 10 by conventional structure omitted from the drawing for clarity sake.

A first form of inertia actuated locking mechanism is referred to in general by the reference numeral 26 and includes a generally horizontal bar 28 mounted within the interior of the door 10 in any convenient manner such as by fasteners 30. A weight body 32 is provided with an upwardly opening slot 34 and a first upper guide wheel 36 is journaled in an upper portion of the slot 34 from the body 32 and a pair of lower guide wheels 38 are journaled in lower portions of the slot 34. The upper and lower peripheries of the wheels 38 and 36 are vertically spaced apart a distance sufficient to receive the bar 28 therebetween and in this manner the weight body 32 is mounted on the bar 28 for back and forth guided shifting therealong. The guide wheels 38 oppose longitudinally spaced lower portions of the guide bar 28 and the guide wheel 36 supports the weight of the body 32 from the upper marginal portion of the bar 28. Further, a connecting link 40 has one end pivotally secured as at 42 to the bell crank 22 and the other end pivotally attached to the weight body 32.

The actuator 14 is in the raised solid line position thereof illustrated in FIG. 1 when the door latch lock is in the inactive position and the actuator 14 is in the lower phantom line position thereof illustrated in FIG. 1 when the door latch lock is in the active or locked position. Accordingly, it will be noted that the vehicle of which the door 10 comprises a part usually travels in a direction extending to the right as viewed in FIG. 1 of the drawings and that the weight body 32 is supported from a rear portion of the bar 28 when the actuator 14 is in the raised inoperative position. However, should the vehicle of which the door 10 comprises a part suddenly decelerate as a result of impact, the inertia of the weight body 32 carries the latter forwardly along the bar 28 and a forward pull is thereby exerted on the connecting link 40 to rotate the bell crank 22 from the solid line position thereof illustrated in FIG. 1 to the phantom line position thereof in order to pull downwardly upon the connecting link 20 and the actuator 14. Of course, counterclockwise rotation of the bell crank 22 from the solid line position of FIG. 1 to the phantom line position of FIG. 1 causes the door latch lock to be actuated immediately after initial impact and therefore the door 10 is less likely to be thrown open as a result of the impact.

Figure 3:
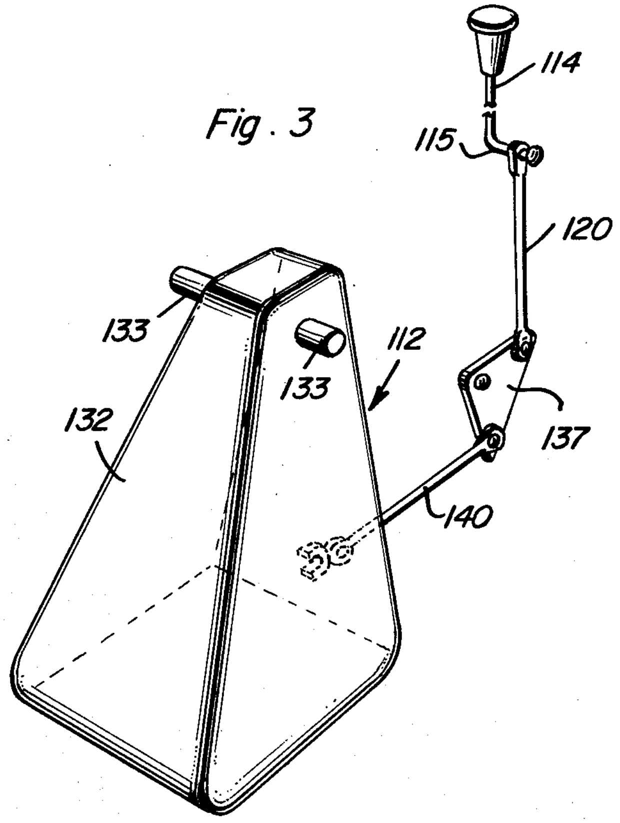
FIG. 3 is a fragmentary perspective view of a portion of a conventional door locking mechanism with a second form of inertia actuated mechanism of the instant invention operatively associated therewith.

With attention now invited more specifically to FIG. 3 of the drawings, there will be seen an actuator 114 corresponding to the actuator 14 and whose lower end 115 is connected to a bell crank (not shown) corresponding to the bell crank 22.

A second form of door locking mechanism is referred to in general by the reference numeral 112 and comprises a pendulum weight body 132 having opposite side outwardly projecting stub axle portions 133 oscillatably supported from spaced opposing internal portions (not shown) of a door corresponding to the door 10. In addition, the mechanism 112 includes a bell crank 137 corresponding to bell crank 22 oscillatably supported within the associated door in any convenient manner and an elongated link 120 has one end thereof pivotally connected to the lower end 115 of the actuator 114 and the other end pivotally connected to the bell crank 137. In addition, a second link 140 is connected between the bell crank 137 and the weight body 132.

The mechanism 112 illustrated in FIG. 3 is positioned within the associated door in a manner such that forward movement of the associated vehicle is in a direction generally paralleling the lower reach or section 141 of the tension member 139 extending from right to left as viewed in FIG. 3. Accordingly, upon the assumption that the actuator 114 is in its raised inoperative position and the associated door latch lock structure is in the inactive position, sudden deceleration of the associated vehicle will cause the lower end portion of the weight body 112 to swing to the left as viewed in FIG. 3 and thereby exert a pull downwardly on the actuator 114 and shift the associated door latch to the locked position. Accordingly, operation of the mechanism 112 is substantially similar to operation of the mechanism 12.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with an upright vehicle door disposed in a plane at least generally paralleling the intended direction of movement of said vehicle and provided with an oscillatable door latch lock actuator shiftable back and forth between active and inactive positions, respectively, said door including support means, weight means mounted from said support means for oscillating movement of a major portion of said weight means along a generally horizontal path generally paralleling said plane, and motion transmitting means operatively connecting said major portion of said weight means to said actuator for downward shifting of said actuator from said inactive position to said active position in response to inertia shifting of said major portion of said weight means in one direction along said path, said support means comprising a horizontally disposed bar generally paralleling said plane, said weight means comprising a weight body having a laterally upwardly opening open-ended slot formed therein in which said bar is loosely received, an upper roller journaled in an upper portion of said slot above said bar and whose lower periphery is rollingly engaged with the upper longitudinal surface of said bar.

2. The combination of claim 1 including a pair of lower rollers journaled in opposite end portions of said slot and including upper peripheral portions closely underlying the lower longitudinal surface of said bar for rolling engagement therewith.

3. In combination with an upright vehicle door disposed in a plane at least generally paralleling the intended direction of movement of said vehicle and provided with a vertically shiftable door latch lock actuator shiftable between upper and lower active and inactive positions, respectively, said door including support means, weight means mounted from said support means for oscillating movement of a major portion of said weight means along a generally horizontal path generally paralleling said plane, and motion transmitting means operatively connecting said major portion of said weight means to said actuator for downward shifting of said actuator from said inactive position to said active position in response to inertia shifting of said major portion of said weight means in one direction along said path, said support means comprising a horizontally disposed bar generally paralleling said plane, said weight means comprising a weight body having a laterally upwardly opening open-ended slot formed therein in which said bar is loosely received, an upper roller journaled in an upper portion of said slot above said bar and whose lower periphery is rollingly engaged with the upper longitudinal surface of said bar.

4. The combination of claim 3 including a pair of lower rollers journaled in opposite end lower portions of said slot and including upper peripheral portions closely underlying the lower longitudinal surface of said bar for rolling engagement therewith.

5. The combination of claim 4 wherein said upper roller is generally centered between upstanding transverse vertical planes containing the axes of rotation of said lower rollers.

* * * * *